(12) United States Patent
Kuang et al.

(10) Patent No.: US 11,689,402 B2
(45) Date of Patent: *Jun. 27, 2023

(54) MAPPING INDICATION IN MIXED OFDM NUMEROLOGY

(71) Applicant: Panasonic Intellectual Property Corporation of America, Torrance, CA (US)

(72) Inventors: Quan Kuang, Frankfurt (DE);
Hidetoshi Suzuki, Kanagawa (JP);
Alexander Golitschek Edler Von Elbwart, Darmstadt (DE)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/564,931

(22) Filed: Dec. 29, 2021

(65) Prior Publication Data

US 2022/0123981 A1     Apr. 21, 2022

Related U.S. Application Data

(63) Continuation of application No. 16/618,469, filed as application No. PCT/EP2018/062447 on May 15, 2018, now Pat. No. 11,252,001.

(30) Foreign Application Priority Data

Jun. 16, 2017  (EP) .................................. 17176513

(51) Int. Cl.
*H04L 12/50*     (2006.01)
*H04L 27/26*     (2006.01)
*H04L 5/00*      (2006.01)

(52) U.S. Cl.
CPC ...... *H04L 27/26025* (2021.01); *H04L 5/0039* (2013.01); *H04L 27/2613* (2013.01); *H04L 5/0007* (2013.01)

(58) Field of Classification Search
CPC ........... H04L 12/28; H04L 12/50; H04W 1/05
(Continued)

(56) References Cited

U.S. PATENT DOCUMENTS

| | | | |
|---|---|---|---|
| 10,797,918 B2 | 10/2020 | Baldemair et al. | |
| 11,252,001 B2 * | 2/2022 | Kuang | .............. H04L 27/26025 |
| 11,424,792 B2 * | 8/2022 | Shattil | .................. H04B 7/0456 |
| 2021/0119697 A1 | 4/2021 | Wang et al. | |

FOREIGN PATENT DOCUMENTS

JP     2018-521587 A     8/2018

OTHER PUBLICATIONS

Chinese Office Action, dated Mar. 28, 2022, for Chinese Application No. 201880038056.2, 27 pages, (with English translation).
(Continued)

*Primary Examiner* — Dang T Ton
(74) *Attorney, Agent, or Firm* — Seed IP Law Group LLP

(57) ABSTRACT

The present disclosure relates to a transmission device, a reception device, a transmission method and a reception method. The transmission device comprises a circuitry which, in operation, maps data and/or a reference signal onto a resource unit of a communication system. The resource unit includes subcarriers of a first numerology and subcarriers of a second numerology, each of the subcarriers being orthogonal to the other subcarriers of the same numerology, wherein the first numerology differs from the second numerology at least by a larger subcarrier spacing, and the subcarriers of the first and the second numerologies are frequency-multiplexed on a subcarrier basis. The transmission device further comprises a transmitter which, in operation, transmits the mapped data and/or reference signal in the
(Continued)

resource unit, including subcarriers of the first and/or of the second numerology, and also transmits an indication of the mapping for the resource unit, which comprises references to subcarriers from the subcarriers of the first and/or the second numerology, where: for the first numerology, all subcarriers of the resource unit can be referenced, and for the second numerology, only inter-numerology-orthogonal subcarriers thereof can be referenced, each of the inter-numerology-orthogonal subcarriers being centrally aligned with a subcarrier of the first numerology.

6 Claims, 8 Drawing Sheets

(58) Field of Classification Search
USPC .......................................... 370/329, 400, 405
See application file for complete search history.

(56) References Cited

OTHER PUBLICATIONS

3GPP, "3rd Generation Partnership Project; Technical Specification Group Radio Access Network; Study on New Radio Access Technology; Radio Access Architecture and Interfaces (Release 14)," 3GPP TR 38.801 V2.0.0, Mar. 2017, 90 pages.
3GPP, "3rd Generation Partnership Project; Technical Specification Group Radio Access Network; Study on Scenarios and Requirements for Next Generation Access Technologies; (Release 14)," 3GPP TR 38.913 V14.1.0, Dec. 2016, 38 pages.
Extended European Search Report, dated Nov. 29, 2017, for corresponding European Application No. 17176513.4-1875, 10 pages.
International Search Report, dated Jul. 24, 2018, for corresponding International Application No. PCT/EP2018/062447, 2 pages.
Panasonic, "CSI acquisition for mixed numerology," R1-1705940, Agenda Item: 8.1.2.3.1, 3GPP TSG-RAN WG1 Meeting #88bis, Apr. 3-7, 2017, Spokane, USA, 4 pages.
Panasonic, "ZP CSI-RS for PDSCH rate matching," R1-1708216, Agenda Item: 7.1.2.3.1, 3GPP TSG-RAN WG1 Meeting #89, May 15-19, 2017, Hangzhou, P.R., China, 3 pages.
ZTE et al., "Frequency multiplexing of numerologies," R1-166492, Agenda Item: 8.1.3.1, 3GPP TSG RAN WG1 Meeting #86, Aug. 22-26, 2016, Gothenburg, Sweden, 8 pages.
AT&T, "Design and Evaluation of CSI-RS for NR MIMO with Mixed Numerology Support," R1-1700315, Agenda item: 5.1.2.3.1, 3GPP TSG RAN WG1 NR Ad-Hoc Meeting, Spokane, USA, Jan. 16-20, 2017, (23 pages).
Japanese Notice of Reasons for Rejection, dated Jan. 4, 2022, for Japanese Application No. 2019-568603, (9 pages), (with English translation).

* cited by examiner

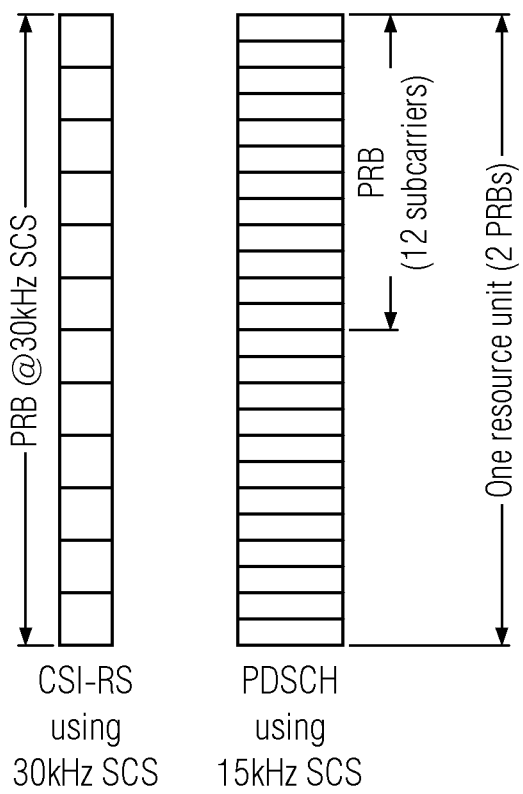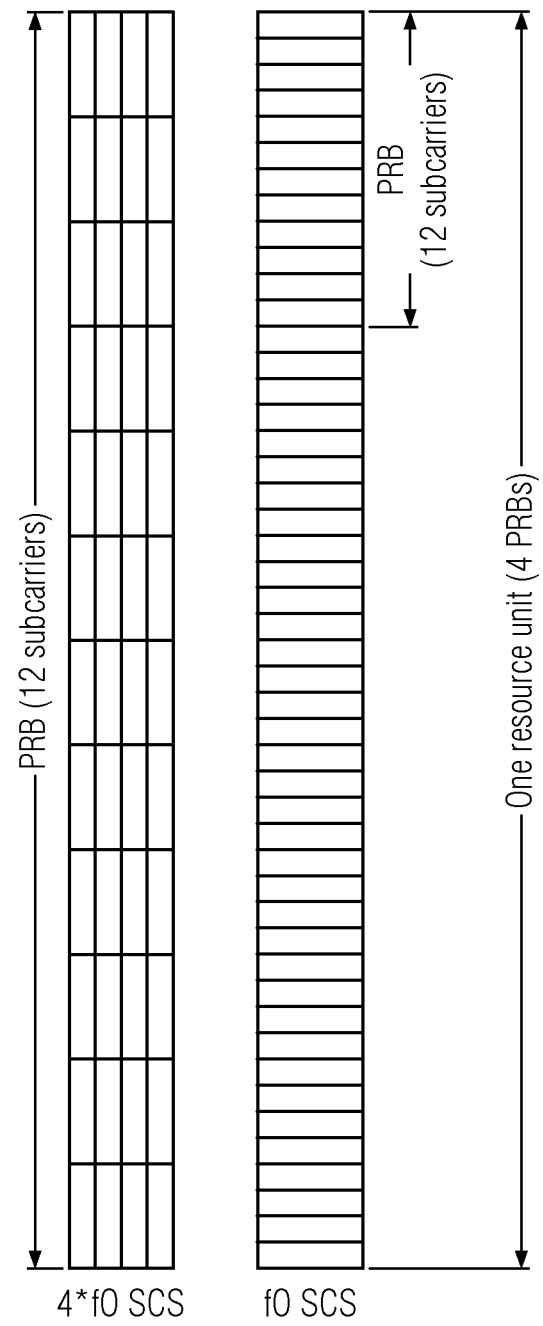
FIG. 7A
FIG. 7B

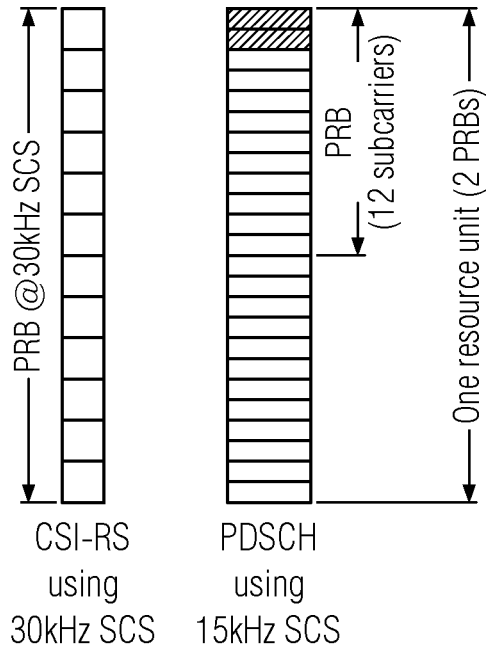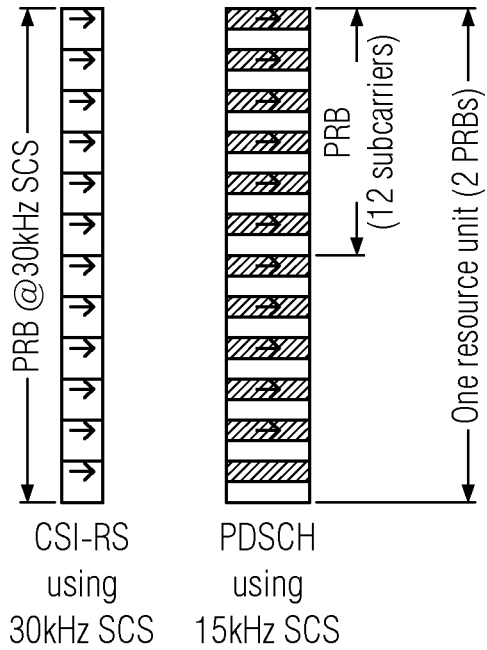
FIG. 8A  FIG. 8B
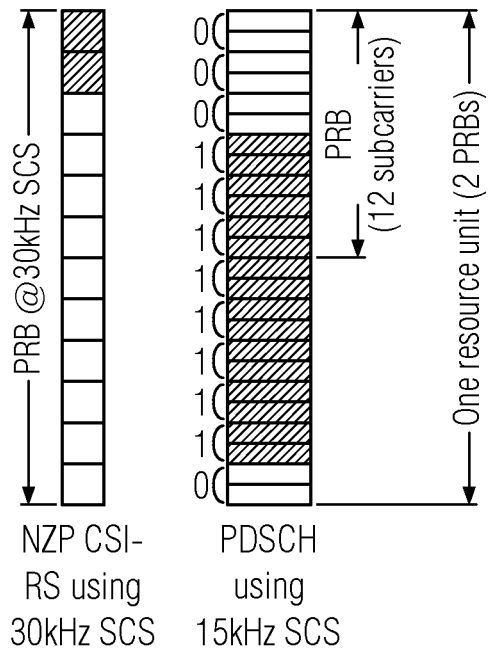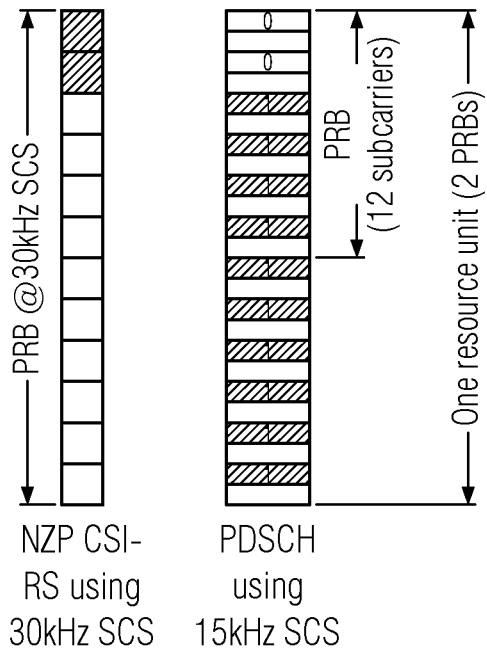
FIG. 9A  FIG. 9B

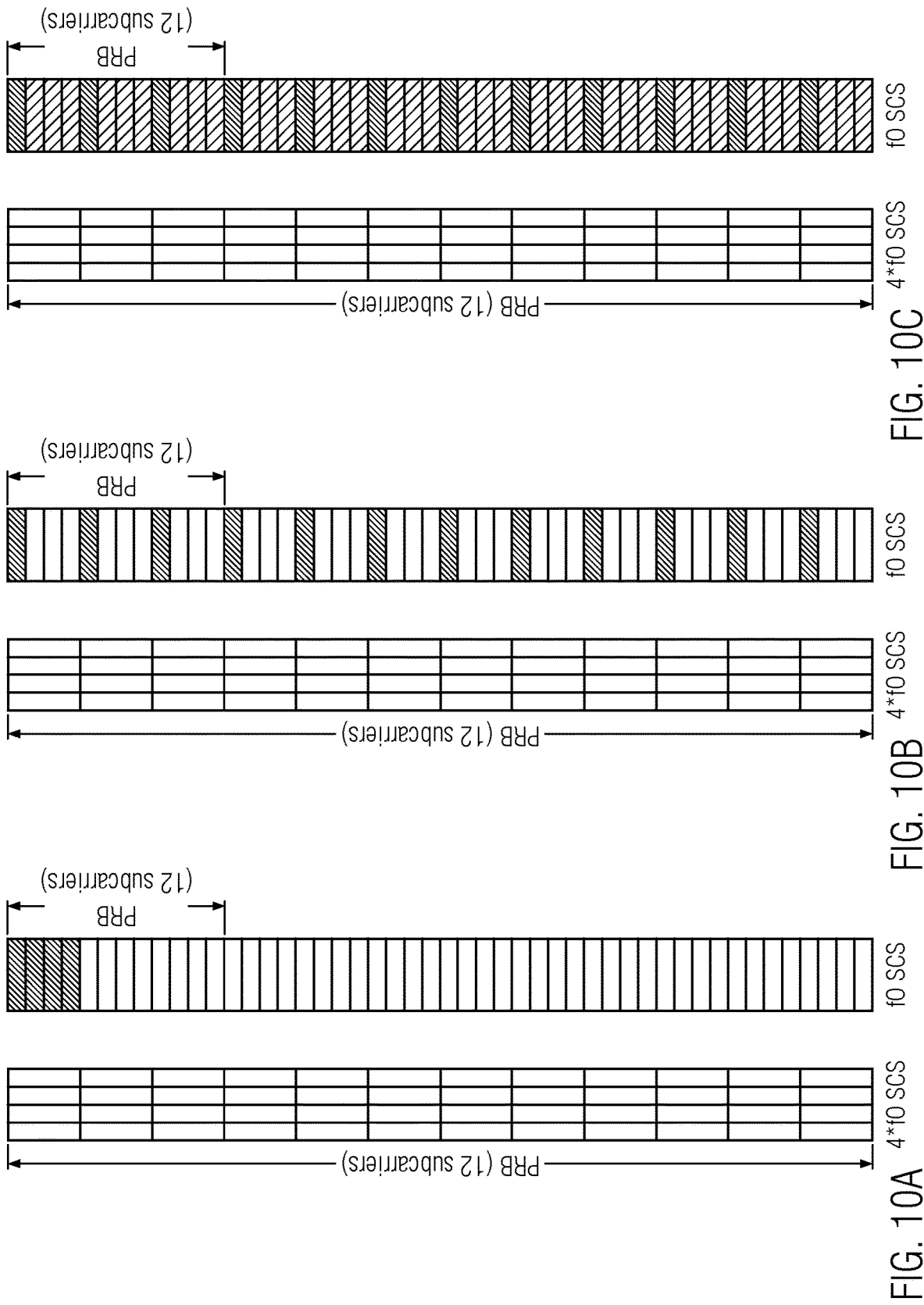

MAPPING INDICATION IN MIXED OFDM NUMEROLOGY

BACKGROUND

Technical Field

The present disclosure relates to transmission and reception of data and/or reference signals in resources of a communication system including subcarriers with different subcarrier spacing.

Description of the Related Art

Currently, the $3^{rd}$ Generation Partnership Project (3GPP) focuses on the next release (Release 15) of technical specifications for the next generation cellular technology, which is also called fifth generation (5G). At the 3GPP Technical Specification Group (TSG) Radio Access network (RAN) meeting #71 (Gothenburg, March 2016), the first 5G study item, "*Study on New Radio Access Technology*" involving RAN1, RAN2, RAN3 and RAN4 was approved and is expected to become the Release 15 work item (WI) which will defines the first 5G standard.

One objective of 5G new radio (NR) is to provide a single technical framework addressing all usage scenarios, requirements and deployment scenarios defined in 3GPP TSG RAN TR 38.913 v14.1.0, *"Study on Scenarios and Requirements for Next Generation Access Technologies,"* December 2016 (available at www.3gpp.org and incorporated herein in its entirety by reference), at least including enhanced mobile broadband (eMBB), ultra-reliable low-latency communications (URLLC), massive machine type communication (mMTC).

For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC may include the scenarios with large number of devices with non-time critical data transfers such as smart wearables and sensor networks.

Another objective is the forward compatibility anticipating future use cases/deployment scenarios. The backward compatibility to the Long Term Evolution (LTE) is not required, which facilitates a completely new system design and/or the introduction of novel features.

As summarized in one of the technical reports for the NR study item (3GPP TSG TR 38.801 v2.0.0, *"Study on New Radio Access Technology; Radio Access Architecture and Interfaces,"* March 2017), the fundamental physical layer signal waveform will be based on Orthogonal Frequency Division Multiplexing (OFDM). For both downlink and uplink, OFDM with cyclic prefix (CP-OFDM) based waveform is supported. Discrete Fourier Transformation (DFT) spread OFDM (DFT-S-OFDM) based waveform is also supported, complementary to CP-OFDM waveform at least for eMBB uplink for up to 40 GHz.

One of the design targets in NR is to seek a common waveform as much as possible for downlink, uplink and sidelink. It has been considered that the introduction of the DFT spreading might not be needed for some cases of uplink transmission. The term "downlink" refers to communication from a higher node to a lower node (e.g., from a base station to a relay node or to a UE, from a relay node to a UE, or the like). The term "uplink" refers to communication from a lower node to the higher node (e.g., from a UE to a relay node or to a base station, from a relay node to a base station, or the like). The term "sidelink" refers to communication between nodes at the same level (e.g., between two UEs, or between two relay nodes, or between two base stations).

SUMMARY

Various embodiments of the present disclosure provide an integrated circuit for a transmission device. The integrated circuit includes mapping circuitry which, in operation, maps one or both of data and a reference signal onto a resource unit of a communication system. The resource unit includes subcarriers of a first numerology and subcarriers of a second numerology. The subcarriers of the first numerology are orthogonal to each other, and the subcarriers of the second numerology are orthogonal to each other. The first numerology has a larger subcarrier spacing than the second numerology. Subcarriers of the first and the second numerologies are frequency-multiplexed on a subcarrier basis. The subcarriers of the second numerology include inter-numerology-orthogonal subcarriers and non-inter-numerology-orthogonal subcarriers. Each of the inter-numerology-orthogonal subcarriers is aligned with a respective subcarrier of the subcarriers of the first numerology, and each of the non-inter-numerology-orthogonal subcarriers is unaligned with the subcarriers of the first numerology and between two adjacent subcarriers of the first numerology. The mapped one or both of the data and the reference signal are mapped to a subcarrier that is among the subcarriers of the first numerology and among the inter-numerology-orthogonal subcarriers. The integrated circuit further includes transmitting circuitry which, in operation, transmits the mapped one or both of the data and the reference signal on the resource unit, and transmits an indication of a mapping of the mapped one or both of the data and the reference signal on the resource unit. The indication is configured to reference subcarriers among a group of subcarriers that includes the subcarriers of the first numerology and the inter-numerology-orthogonal subcarriers, and excludes the non-inter-numerology-orthogonal subcarriers.

BRIEF DESCRIPTION OF DRAWINGS

FIGS. 7A and 7B are schematically illustrating a resource unit with mixed numerologies, employing 15 kHz and 30 kHz SCS numerologies;

FIGS. 8A and 8B are schematically illustrating data transmissions in a resource unit with mixed numerologies, employing 15 kHz and 30 kHz SCS numerologies;

FIGS. 9A and 9B are schematically illustration data and reference in a resource unit with mixed numerologies, employing 15 kHz and 30 kHz SCS numerologies; and FIGS. 10A-10C are schematically illustrating data transmissions in a resource unit with mixed numerologies, employing 15 kHz and 60 kHz SCS numerologies.

DETAILED DESCRIPTION

As identified in TR 38.913, the various use cases/deployment scenarios for NR have diverse requirements in terms of data rates, latency, and coverage. For example, eMBB is expected to support peak data rates (up to 20 Gbps for downlink and 10 Gbps for uplink) and user-experienced data rates in the order of three times what is presently offered by IMT-Advanced. On the other hand, in case of URLLC, the tighter requirements are put on ultra-low latency (down to 0.5 ms for UL and DL each for user plane latency) and high reliability. Finally, mMTC requires high connection density (up to 1,000,000 devices/km² in an urban environment), large coverage in harsh environments, and extremely long-life battery for low cost devices (up to 15 years).

Therefore, multiple OFDM numerologies are supported in the NR network, each of which can be optimized to one service scenario. A numerology is defined by subcarrier spacing and CP overhead.

Figure 1:
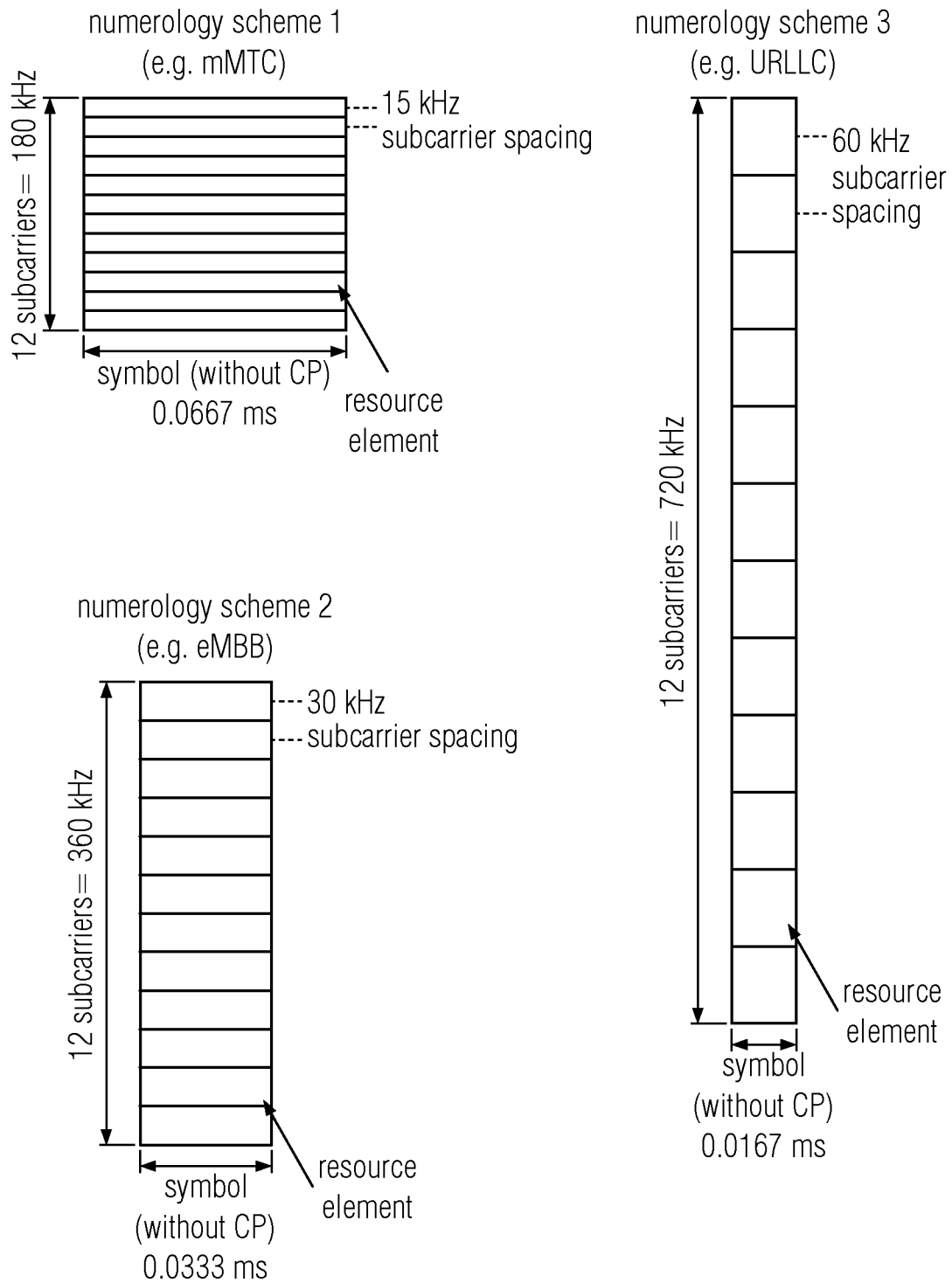
FIG. 1 is a schematic drawing illustrating different numerologies.

It has been decided that the subcarrier spacing values in different numerologies are derived by scaling a basic subcarrier spacing by an integer N. In RAN1 #85 (Nanjing, May 2016), it was concluded as a working assumption that the LTE-based numerology including 15 kHz subcarrier spacing is the baseline design for the NR numerology. For the scaling factor N, it was concluded $N=2^m$ as the baseline design assumption. Correspondingly, subcarrier spacings of 15 kHz, 30 kHz, 60 kHz . . . are being considered. FIG. 1 illustrates three different subcarrier spacings (15 kHz, 30 kHz, and 60 kHz) and the corresponding symbol duration.

The symbol duration $T_n$ and the subcarrier spacing $\Delta f$ are directly related through the formula $\Delta f=1/T_n$. In a similar manner as in the LTE systems, the term "resource element" (RE) is used to denote a minimum resource unit being composed of one subcarrier for the length of one OFDM or Single-Carrier (SC) Frequency Division Multiple Access (SC-FDMA) symbol.

In order to accommodate different services with diverse requirements, it has been decided that multiplexing different numerologies within a same NR carrier bandwidth (from the network perspective) is supported in TDM and/or FDM manner for both downlink and uplink. On the other hand, from a UE perspective, a UE may support one or more than one usage scenarios (e.g., an eMBB UE or a UE supporting both eMBB and URLLC). Generally speaking, supporting more than one numerology can complicate UE processing.

For subcarrier spacing of $2^m \times 15$ kHz, it has been decided that subcarriers are mapped on the subset/superset of those for subcarrier spacing of 15 kHz in a nested manner in the frequency domain and the physical resource block (PRB) grids are defined as the subset/superset of the PRB grid for subcarrier spacing of 15 kHz in a nested manner in the frequency domain.

Figure 2:
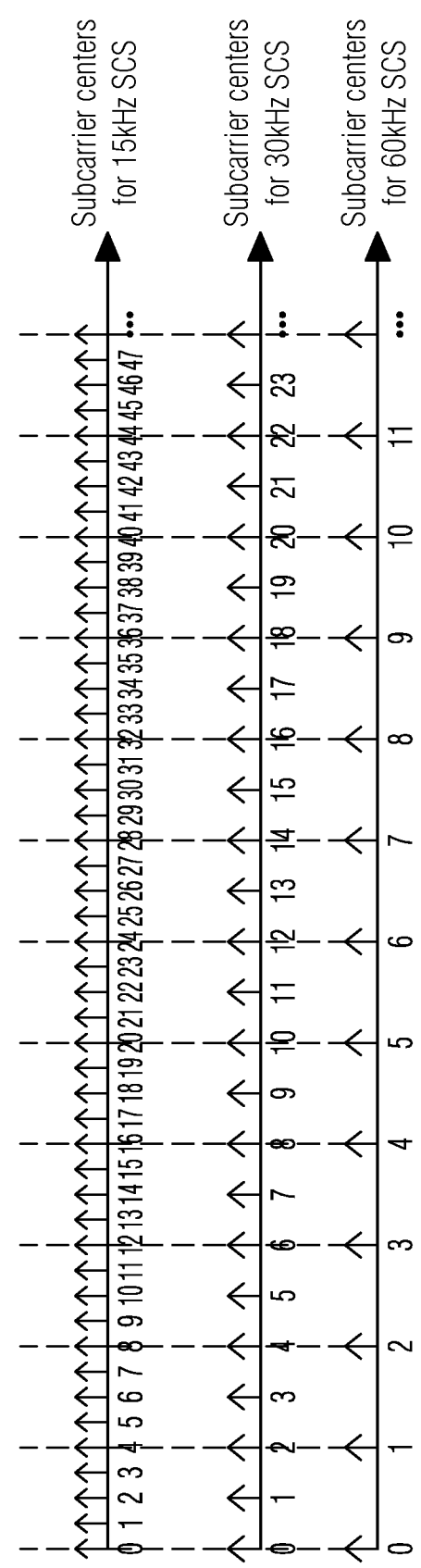
FIG. 2 is a schematic drawing illustrating the nested structure of subcarriers for different subcarrier spacings.

FIG. 2 illustrates one example of the nested structure of subcarriers for three subcarrier spacings: 15 kHz, 30 kHz, and 60 kHz.

If subcarriers in different numerologies are nested (as agreed in RAN1 #86), certain subcarriers in different numerologies are orthogonal across different numerologies. In the case of the nested structure of subcarriers as shown in FIG. 2, the following subcarriers are orthogonal across numerologies:

For the largest SCS $\Delta f_{max}$ (60 kHz), all subcarriers, i.e., k=0, 1, 2, . . . , are orthogonal across numerologies.

For SCS $\Delta f=\Delta f_{max}/N$, subcarriers with indices k×N where k is the subcarrier index for the largest SCS, are orthogonal across numerologies. In particular, for SCS $\Delta f=30$ Hz, subcarriers l=0, 2, 4, . . . , are orthogonal across numerologies. Further, for SCS $\Delta f=15$ Hz, subcarriers m=0, 4, 8, . . . , are orthogonal across numerologies.

In the case where subcarrier indexing bias is introduced for certain numerology with SCS $\Delta f=\Delta f_{max}/N$, the inter-numerology-orthogonal subcarrier is identified as k×N+bias. E.g., if 15 kHz-SCS subcarrier #1 is aligned with 60 kHz-SCS subcarrier #0 (meaning that indexing bias for 15 kHz-SCS numerology is one), then subcarriers I=1, 5, 9, . . . in 15 kHz-SCS are orthogonal across numerologies.

In 3GPP RAN1 #87, it has been agreed that NR strives for efficient support of dynamic resource allocation of different numerologies in FDM/TDM fashion (from network perspective). In order to support dynamic resource sharing, the scheduler should have the channel state information (CSI) over the shared resources with respect to different numerologies involved. In particular, each receiver measures the channel parameters and generates, based thereon, the CSI which is provided on a regular (synchronous and/or asynchronous) basis to the transmitter. In LTE and expectedly also in NR, the transmitter may have the role of scheduler and be implemented in a network node such as a base station. On the other hand, the receivers may be terminals (user equipment, UE) of any kind.

In LTE release 10 and above, CSI reference signal (CSI-RS) can be used for the UE to form a CSI report which is then fed back to the scheduler. The CSI-RS is frequency-multiplexed with data carried in a Physical Downlink Shared Channel (PDSCH) in LTE. PDSCH is a physical channel for transmission in downlink direction, i.e., from a scheduling node (base station, eNB or gNB) to a UE. The term "shared" refers to the fact that the physical resources are allocated dynamically among a plurality of UEs, i.e., shared, based on the current traffic rather than connection based.

Since CSI-RS and PDSCH are transmitted using the same numerology, subcarriers carrying CSI-RS and PDSCH are orthogonal to each other. Therefore, there is no interference between CSI-RS and PDSCH within a cell.

Figure 3A:
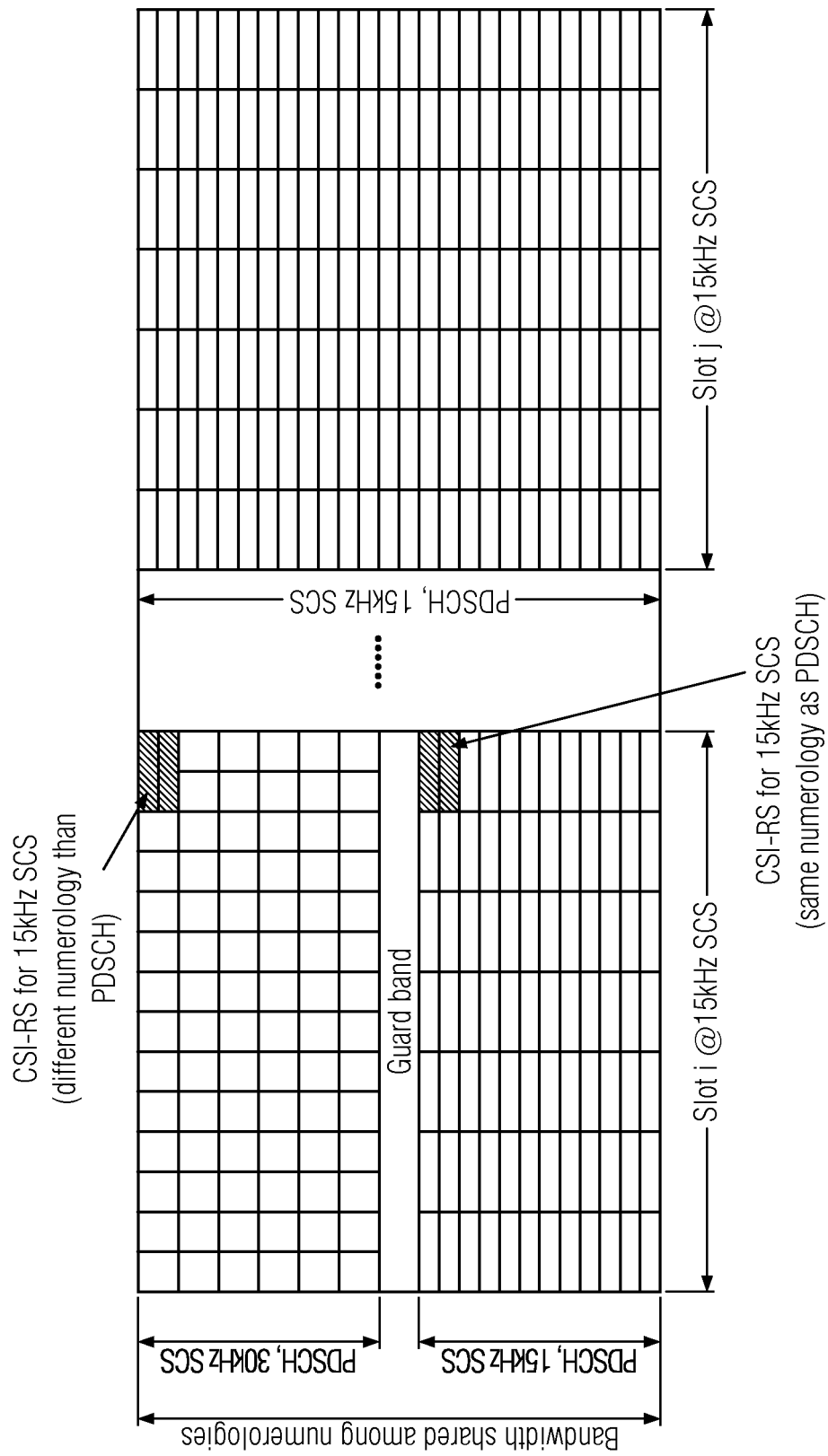
FIGS. 3A and 3B are a schematic drawings illustrating interference due to non-inter-numerology-orthogonal subcarriers.

For NR, it has been agreed that CSI-RS is supported for CSI acquisition. CSI report may need the measurements of both channel and inter-cell interference. In NR, however, it could happen that CSI-RS and PDSCH are transmitted using different numerologies, considering the fact that multiple numerologies coexist in the network. This will result in inter-numerology interference because the subcarriers belonging to different numerologies are not orthogonal in general. FIG. 3A illustrates one such example. Up to now, it remains unclear how to coordinate the transmission of CSI-RS and the PDSCH for the mixed numerologies to avoid inter-numerology interference. It is noted that, in general, the channel over which data are transmitted does not have to be PDSCH. This problem occurs for different co-existing numerologies irrespectively of the type of the channel. In general, any data channel carrying payload and/or control information may be concerned and the following exemplary embodiments are also applicable to any such channel.

Referring to FIG. 3A, in slot i, the bandwidth for PDSCH transmission is partitioned equally between 15 kHz-SCS numerology and 30 kHz-SCS numerology. However, the scheduler needs CSI from 15 kHz-SCS UEs over whole shared bandwidth in order to schedule 15 kHz-SCS UEs over a larger frequency bandwidth in slot j to accommodate an increased traffic. Therefore, in slot i, CSI-RS using 15 kHz SCS is transmitted over data (PDSCH) region of 30 kHz SCS, resulting inter-numerology interference. The inter-numerology interference will adversely impact the channel estimation quality due to the interference from PDSCH to CSI-RS, and the decoding of PDSCH due to the interference from CSI-RS to PDSCH.

The above description is from 15 kHz-SCS UE perspective. On the other hand, the scheduler also needs the channel state report from 30 kHz-SCS UEs in order to schedule these UEs. There are two options of choosing the numerology for CSI-RS transmission in this case.

The first option is that a single numerology is used to transmit CSI-RS over the whole shared bandwidth. For example, 15 kHz SCS is used for transmitting CSI-RS over the PDSCH bandwidth shared by 15 kHz and 30 kHz SCSs, as shown in FIG. 3A. Then 30 kHz-SCS UEs can be configured to detect the CSI-RS using 15 kHz-SCS by, e.g., CSI configuration message.

With this design, 15 kHz-SCS UEs can detect CSI-RS and decode data channel simultaneously with a single processing engine, however, 30 kHz-SCS UEs with a single processing engine may need to buffer the data first, and then perform CSI estimation and PDSCH decoding in serial, potentially causing extra delay for CSI reporting. Considering the total CSI reporting time, this extra delay would be negligible.

Figure 3B:
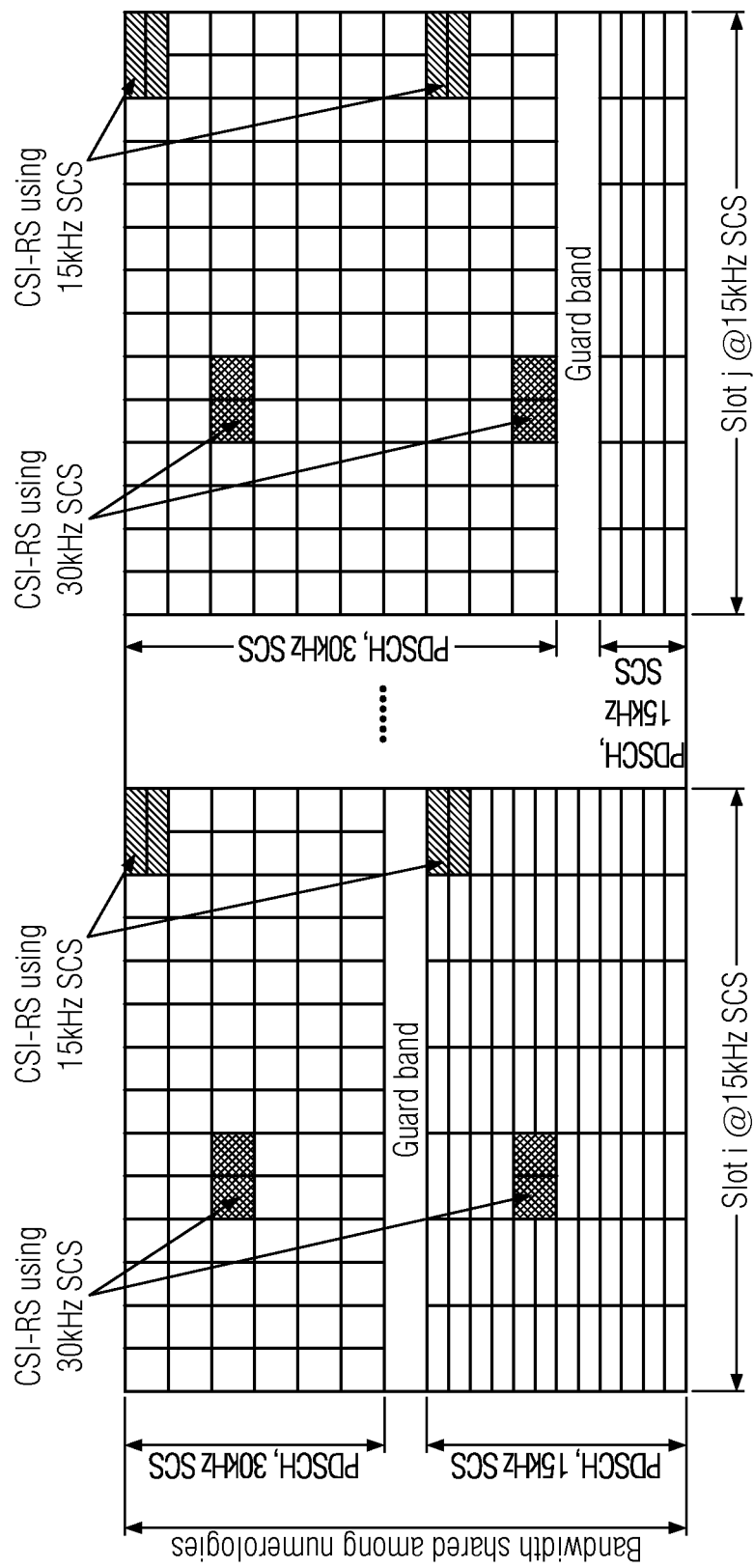

The second option is that multiple numerologies are used to transmit CSI-RS, each of which is over the whole shared bandwidth. FIG. 3B illustrates one such example, where CSI-RS is transmitted by both 15 kHz and 30 kHz SCSs. In such case, each UE detects the CSI-RS with the same numerology as data. Therefore, UEs are not required to handle different numerologies, however, the overhead of CSI-RS may increase from the network perspective, compared to the first option.

Irrespective to the used numerology or numerologies for CSI-RS, there is always a possibility that CSI-RS and the underlying PDSCH being transmitted by different numerologies, at least for periodic and semi-persistent CSI-RS transmission. This is because PDSCH with certain numerology can be dynamically scheduled per scheduling interval, or TTI, over the shared bandwidth, whereas periodic and semi-persistent CSI-RS resources are adapted on a slower timescale (e.g., every multiple of a TTI). Not allowing mixture of CSI-RS and PDSCH with different numerologies may largely restrict scheduling flexibility of used numerology (numerologies) of PDSCH.

In order to remove partially or completely the inter-numerology interference, some resource elements, REs, need to be muted, not carrying any data or other signals. Therefore, PDSCH RE mapping should avoid those muted REs. For example, when the base station schedules and transmits the PDSCH, the PDSCH can be rate matched around the muted REs. In such case, the PDSCH RE mapping should be known to the PDSCH receiving UE in order for a correct de-mapping.

Besides the above-mentioned reason to deal with inter-numerology interference, there are other reasons that PDSCH receiving UE should be informed the PDSCH RE mapping. E.g., it has been agreed in 3GPP that NR design should take into account the forward compatibility. It means, if some features are introduced in future, it shall not cause negative impact on the network devices that are supported by the earlier releases. In view of this design principle, it is very beneficial to have a certain mechanism to inform UE of the PDSCH RE mapping from the first release of NR. With this mechanism, some REs can be reserved for the further usage which is currently unknown.

In LTE, Zero-power (ZP) CSI-RS is allowed to be configured for PDSCH rate matching. With this method, the REs that are allowed to be muted are restricted within the candidate CSI-RS positions. Therefore, the concept of ZP CSI-RS in LTE might not be sufficiently flexible in NR to possibly include various use cases of the muted REs. The current disclosure provides solutions to configure and indicate the PDSCH RE mapping, taking into account the mixed numerologies coexisting in the NR system.

Since PDSCH could be transmitted with a different numerology than CSI-RS and hence one PRB for PDSCH could correspond to multiple PRBs for CSI-RS and vice versa, in the current discussion, it remains unclear what the (basic) resource unit for configuring PDSCH RE mapping is. The (basic) resource unit refers to the resources in time domain and frequency domain within which the PDSCH RE mapping is indicated. Then this mapping pattern is repeated per (basic) resource unit. In LTE, because there is no mixed numerologies issue, the basic resource unit is one PRB in frequency and one subframe in time. However, in NR, it is open whether one configuration of PDSCH RE mapping applies to one PRB or multiple PRBs.

Another question that is resolved by current disclosure is that what is the granularity for configuring PDSCH RE mapping. E.g., should it be a single RE or multiple REs? Should it be contiguous REs or distributed REs if multiple REs are grouped into one granularity. To have single RE granularity is most flexible for the configuration, but it will cause large signalling overhead. The current disclosure provides an efficient design with low overhead and high flexibility.

The current disclosure provides solutions to coordinate the transmission of reference signals (e.g., CSI-RS) and the data (e.g., carried by PDSCH) in a mixed numerology reference unit. The coordination enables the reception device to receive the reference signal transmission, or the data transmission or both transmissions in the respective numerology.

Generally, the present disclosure provides devices and methods for the efficient signalling (e.g., having a fixed size or small size) of a mapping in a resource unit employing mixed numerology in a communication system. The signalling can also referred to as mapping indication.

In some example, a transmission device (or mapping circuit) signals a mapping indication referencing data and/or reference signals in mixed numerology reference unit. With the indication, a reception device (or de-mapping unit) receives the data and/or reference signal within the mixed numerology reference unit.

In different numerologies, data and reference signals can be frequency-multiplexed at RE level, i.e., on a resource element basis, however with different subcarrier spacings. Then, a mapping indication must also reflect the RE level. However, as the number of REs within a basic resource unit is numerology specific, the mapping indication on the RE level would normally change with the numerology or numerologies that the basic resource unit has.

Instead, in the present disclosure it is proposed to indicate only RE of the largest subcarrier-spacing numerology and with the option to make the reception device be aware of whether or not additional REs, which cannot be references in the largest subcarrier-spacing numerology, are also implicitly indicated at the same time.

This mapping indication results in an efficient signalling which is consistent between numerologies, since it is restricted to the largest subcarrier-spacing numerology only.

Figure 4:
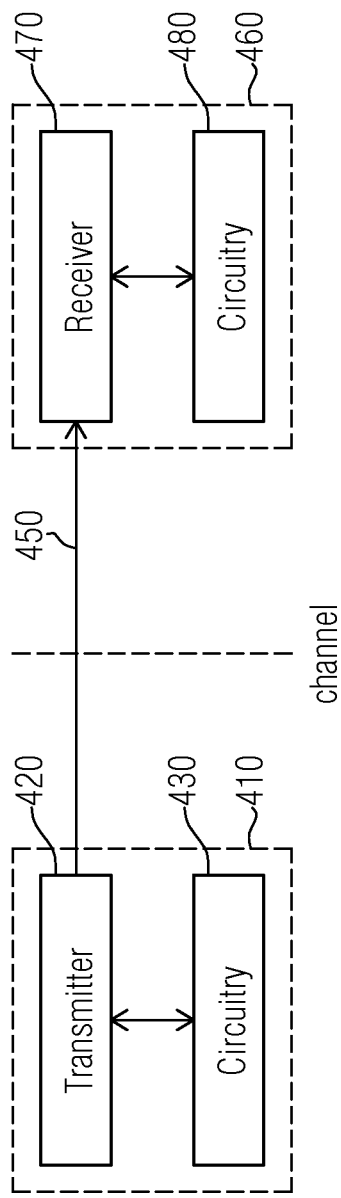
FIG. 4 is a block diagram showing the structure of a transmission device and a reception device.

FIG. 4 illustrates a block diagram of a communication system including a transmission device 410 and a reception device 460 communication with each other over a (wireless) physical channel 450.

The transmission device 410 comprises circuitry 430 which, in operation, maps data and/or a reference signal onto a resource unit of a communication system. The resource unit includes subcarriers of a first numerology and subcarriers of a second numerology. Each of the subcarriers of the first and second numerology is orthogonal to the other subcarriers of the same numerology. The first numerology differs from the second numerology at least by a different (i.e., larger) subcarrier spacing. And the subcarriers of the first and the second numerologies are frequency-multiplexed on a subcarrier basis.

The transmission device 410 further comprises transmitter 420 which, in operation, transmits the mapped data and/or reference signal in the resource unit, including subcarriers of the first and/or of the second numerology. Further, the transmitter 420, in operation, also transmits an indication of the mapping for the resource unit, which comprises references to subcarriers from the subcarriers of the first and/or the second numerology. For the first numerology, all subcarriers of the resource unit can be referenced. For the second numerology, only inter-numerology-orthogonal subcarriers thereof can be referenced, each of the inter-numerology-orthogonal subcarriers being which is centrally aligned with a subcarrier of the first numerology.

The reception device 460 comprises a receiver 470, which, in operation, receives data and/or a reference signal in a resource unit of a communication system. The resource unit includes subcarriers of a first numerology and subcarriers of a second numerology, each of the subcarriers being orthogonal to the other subcarriers of the same numerology, wherein the first numerology differs from the second numerology at least by a larger subcarrier spacing, and the subcarriers of the first and the second numerologies are frequency-multiplexed on a subcarrier basis. The reception device further comprises a circuitry 480, which, in operation, de-maps the data and/or the reference signal from the resource unit, including subcarriers of the first and/or of the second numerology. The receiver 470, in operation, also receives an indication of the mapping for the resource unit, which comprises references to subcarriers from the subcarriers of the first and/or the second numerology, where: for the first numerology, all subcarriers of the resource unit can be referenced, and for the second numerology, only inter-numerology-orthogonal subcarriers thereof can be referenced, each of the inter-numerology-orthogonal subcarriers being centrally aligned with a subcarrier of the first numerology.

Also disclosed is a transmission method to be performed by a transmission device. The transmission method comprises the step of mapping data and/or a reference signal onto a resource unit of a communication system, the resource unit including subcarriers of a first numerology and subcarriers of a second numerology, each of the subcarriers being orthogonal to the other subcarriers of the same numerology, wherein the first numerology differs from the second numerology at least by a larger subcarrier spacing, and the subcarriers of the first and the second numerologies are frequency-multiplexed on a subcarrier basis, and transmitting the mapped data and/or reference signal in the resource unit, including subcarriers of the first and/or of the second numerology, and transmitting an indication of the mapping for the resource unit, which comprises references to subcarriers from the subcarriers of the first and/or the second numerology, where: for the first numerology, all subcarriers of the resource unit can be referenced, and for the second numerology, only inter-numerology-orthogonal subcarriers thereof can be referenced, each of the inter-numerology-orthogonal subcarriers being centrally aligned with a subcarrier of the first numerology.

Further disclosed is a reception method to be performed by a reception device. The reception method comprises the step of receiving data and/or a reference signal in a resource unit of a communication system, the resource unit including subcarriers of a first numerology and subcarriers of a second numerology, each of the subcarriers being orthogonal to the other subcarriers of the same numerology, wherein the first numerology differs from the second numerology at least by a larger subcarrier spacing, and the subcarriers of the first and the second numerologies are frequency-multiplexed on a subcarrier basis, receiving an indication of the mapping for the resource unit, which comprises references to subcarriers from the subcarriers of the first and/or the second numerology, where: for the first numerology, all subcarriers of the resource unit can be referenced, and for the second numerology, only inter-numerology-orthogonal subcarriers thereof can be referenced, each of the inter-numerology-orthogonal subcarriers being centrally aligned with a subcarrier of the first numerology, and de-mapping the data and/or the reference signal from the resource unit, including subcarriers of the first and/or of the second numerology.

it is noted that the transmission device 410 can be embedded in a base station (scheduling note) and/or in a terminal (UE). Moreover, the reception device 460 may also be embedded in a base station and/or terminal.

In downlink operation, the base station operates as the transmission device 410. It may configure a terminal by transmitting to the terminal mapping indication for the different numerologies. Subsequently, the base station may schedule data for a terminal, and transmit the data and/or reference signals to the terminal in the different numerologies. The terminal receives the data and/or reference signal, and may de-map same utilizing the mapping information. With the reference signal, the terminal may measure the channel and/or inter-cell interference, and may provide a CSI report back to the base station.

In uplink operation, the base station operates as the reception device 460. It may configure a terminal with mapping indication for the different numerologies. Subsequently, the base station may schedule a transmission from a terminal by providing the terminal with uplink resource allocation information. Then, the terminal transmits to the base station the data and/or reference signal to the base station, following the mapping information. The base station receives the data and/or reference signal and may de-map same utilizing the mapping information.

In case that data and a reference signal are assigned to resource elements to be transmitted and/or received with different numerologies, the data may be mapped to subcarriers of one of the first and second numerologies, and the reference signal may be mapped to the respective other of the first and second numerologies, i.e., other than the numerology to which the data are mapped.

The term "data" above refers to control data and/or payload. The term "reference signal" denotes a signal which is known to both the transmission and reception device. For instance, the location and the value (of at least one parameter) of the reference signal may be specified in a standard or pre-configured.

The communication system may be a cellular system with a wireless interface. Such a cellular system may also be mobile, i.e., supporting seamless mobility of the transmission/reception devices. The data may, for example, be transmitted/received on the PDSCH of such a cellular system. Furthermore, an example of a reference signal is a general state information reference signal (CSI-RS). However, the present disclosure is not limited thereto, but rather applicable to transmission/reception of any communication system.

Different types of CSI-RS include non-zero-power (NZP) CSI-RS, and zero-power (ZP) CSI-RS, to which no transmit power is allocated. A zero-power CSI-RS is configured for the measurement of inter-cell interference measurements. In the current disclosure, ZP CSI-RS distinguished from "zero-power resource elements," which are resource elements to which no transmit power is allocated either. However, in general, ZP resource elements are not configured for any measurement.

A numerology may be defined at least by its subcarrier spacing (SCS) such that different numerologies have different subcarrier spacings. Different numerologies may be used for the transmission of reference signals and for data. For example, the numerology of 30 kHz SCS is used for reference signal transmission and the numerology of 15 kHz SCS is used for data transmission.

A resource unit may be based on the subcarriers of an OFDM system. Such resource unit may comprise multiple resources, each of which may be defined by a subcarrier in frequency domain and a symbol in time domain, such as an OFDM symbol. A resource defined by one subcarrier and one symbol is also called resource element (RE), which is the smallest physical resource in the system.

A resource unit refers to the resources in time domain and frequency domain within which the mapping indication is configured. Generally speaking, the resources being scheduled for data and/or reference signal transmission can be much larger than one resource unit. In such case, mapping pattern configured within one resource unit is repeated over the whole range of scheduled resources.

A resource unit is defined independent of the numerologies. For this purpose, the resource unit can be defined in the communication system with a certain bandwidth. For example, the resource unit consists of 12 subcarriers of the numerology with respect to the largest subcarrier spacing. Assuming a 30 kHz SCS numerology is used as the largest subcarrier spacing, the resource unit amounts to 360 kHz in the frequency domain.

The resource unit can also be defined, independent of the numerologies, with reference to a physical resource block (PRB). Similar to LTE, in NR a physical resource block consists of 12 subcarriers in frequency domain. With this definition of PRB, the resource unit is a PRB in the numerology with the largest subcarrier spacing.

The definition of resource unit should be consistent between the data and reference signal, if data and reference signal are transmitted by different numerologies. E.g., if CSI-RS is configured over 2 PRBs with 15 kHz SCS and data is transmitted with 30 kHz SCS, then one resource unit consists of 1 PRB of 30 kHz SCS (=2 PRBs of 15 kHz SCS). On the other hand, if CSI-RS is configured over 4 PRBs with 15 kHz SCS and data is transmitted with 30 kHz SCS, then one resource unit contains 2 PRBs of 30 kHz SCS (=4 PRBs of 15 kHz SCS).

In the following, the operation of a transmission device and of a reception device according to an exemplary embodiment is described with respect to FIGS. 5 and 6. As the transmission device interoperates with the reception device in the communication system and vice versa, both devices are shown to comprise and will be described with the same processing operations, which however shall not be restricting the present disclosure.

Figure 5:
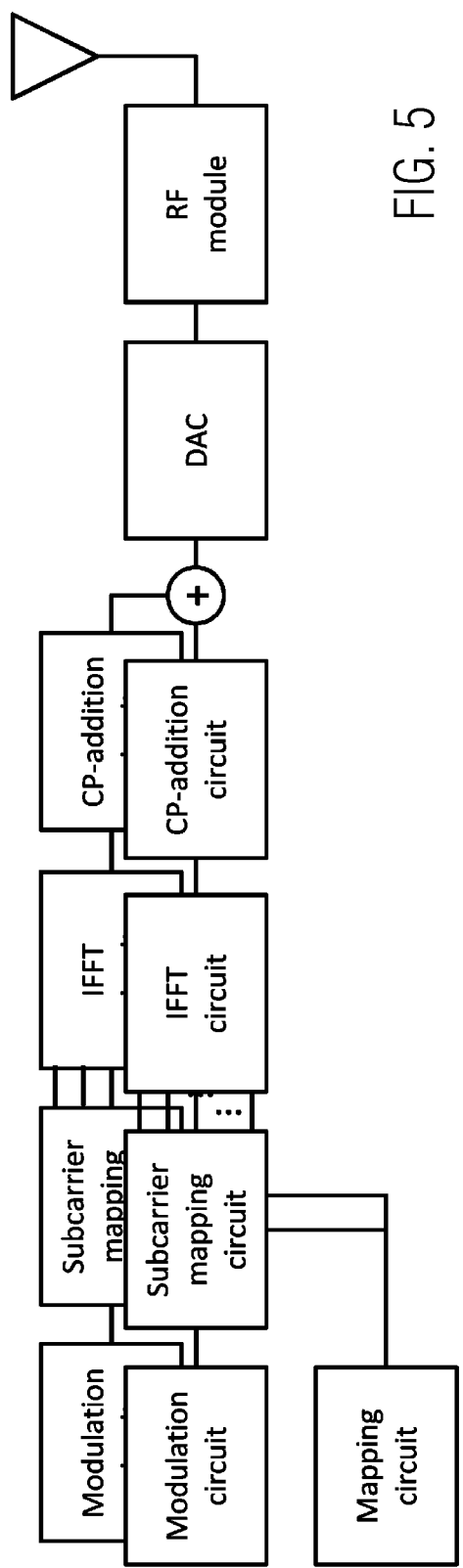
FIG. 5 is a block diagram showing another exemplary structure of the transmission device and illustrating its operation.

Referring to FIG. 5, an exemplary structure of the transmission device 410 is shown. In particular, the transmitter 420 may comprise one or more antennas, and a radio frequency (RF) module, and a Digital-to-Analog Converter (DAC).

The circuitry 430 may comprise one mapping circuit, one or more of a modulation circuit, of a subcarrier mapping circuit, of an inverse fast Fourier transform (IFFT) circuit, and of a cyclic prefix (CP) addition circuit.

In this exemplary structure, a first numerology of 30 kHz SCS is used for reference signal transmission and a second numerology of 15 kHz SCS is used for data transmission. Due to the different numerologies, separate processing chains operate in parallel in the digital domain. The present disclosure shall however not be restricted this respect, since also sequential processing when buffering of a resource unit can be facilitated.

For the transmission of data and a reference signal, the two, separate modulation circuits modulates the data according to a modulation and coding scheme, and separate therefrom, the reference signal and output the modulated data and reference signal to separate subcarrier mapping circuits.

At the same time, the mapping circuit decides to which subcarrier(s) the data and the reference signal should be mapped, respectively. This can be assisted by the scheduler scheduling the reception device. Further, the mapping to be applied can also be specified in a standard or pre-configured.

Then, the separate subcarrier mapping circuits map the modulated data to a subcarrier of the first numerology and the modulated reference signal to a different subcarrier of the second numerology according to mapping information from the mapping circuit. The separate subcarrier mapping circuits output their respective result to separate IFFT circuits.

The separate IFFT circuits perform inverse fast Fourier transform operations with different respective numbers of subcarriers. The sizes of the inverse fast Fourier transforms can be chosen to maintain the same sampling rate for different numerologies. In general, a transformation other than FFT/IFFT may be used, such as discrete cosine transformation DCT/IDCT or any other transformation between time and frequency domain Once the time domain samples have been generated by the separate IFFT circuits, cyclic prefixes are added by the separate cyclic prefix (CP) addition circuits. Different numerologies can have different respective CP lengths. To maintain the same CP overhead for different numerologies the CP length can be scaled by the same scaling factor of the subcarrier spacing.

Thereafter, the time domain samples are added together with the respective CPs from the different numerologies. Then, the Digital-to-Analog Converter (DAC) is converting the obtained samples to the analogue signal which is then converted by the Radio Frequency (RF) module and emitted via one or more antenna(s).

The above described operation of the transmitter device 410 is the same for the transmission of any kind of data including control data and payload. In this respect, no further distinction is made in the following for the transmission of the mapping indication.

After the mapping is configured for one resource unit, the mapping circuit outputs the mapping indication to the modulation circuit and the same processing is performed in digital and analogue domain as described above. Once the mapping is configured for one resource unit, it may be applied to a number of contiguous resource units.

Generally, the transmitting device is configured to first transmit the mapping indication and subsequently the mapped data and reference signal. Thereby, it can be ensured that the reception device, in operation, can immediately de-map the mapped data and reference signal upon receipt. The present disclosure shall not be restricted in this respect. Alternatively, the reception device may also buffer the mapped data and reference before de-mapping.

Figure 6:
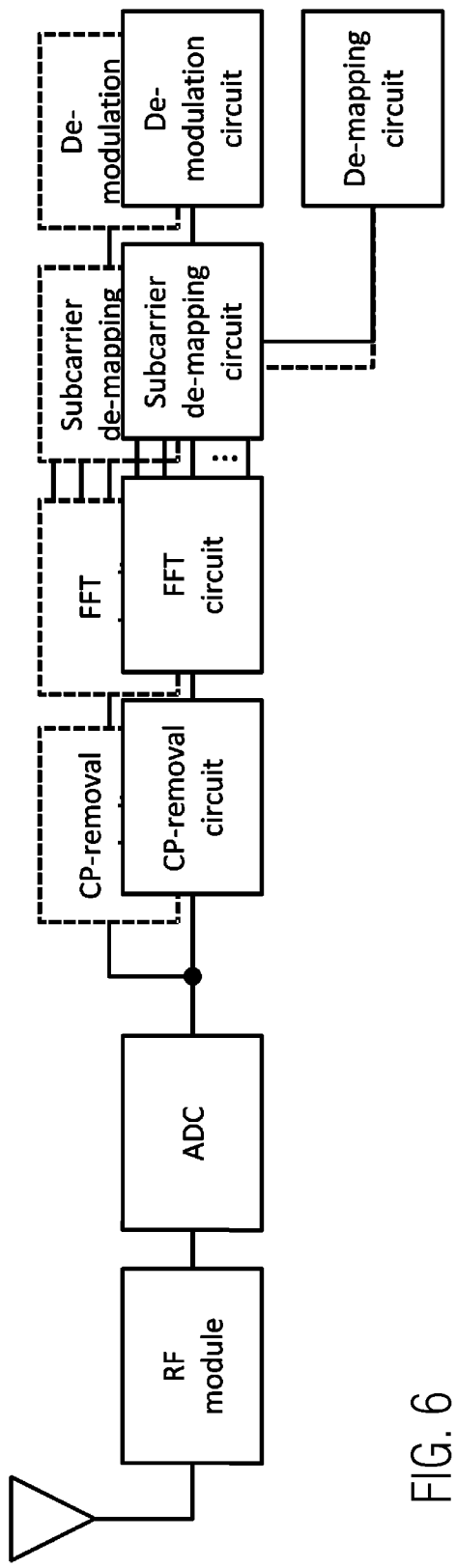
FIG. 6 is a block diagram showing another exemplary structure of the reception device, and illustrating its operation.

Referring to FIG. 6, an exemplary structure of the reception device 460 is illustrated. In particular, the receiver 470 may comprise one or more antennas, and a radiofrequency (RF) module, and an Analog-to-Digital Converter (ADC).

The circuitry 480 may comprise one mapping circuit and one or more of a cyclic prefix (CP) removal circuit, of a fast Fourier transform (FFT) circuit, of a subcarrier de-mapping circuit, and of a de-modulation circuit. Optional circuits are indicated with a broken line.

In this exemplary structure, a radio signal is received via the one or more antennas, then converted by the radio frequency (RF) module and then converted by the Analog-to-Digital converter (ADC) from analog to digital domain.

With different numerologies, the further reception processing can be carried out in parallel, i.e., with one processing chain configured for the first numerology and (optionally) with another processing chain configured for the second numerology. This will be, however, not required for every terminal category. Rather, the reception device can also have only a single processing chain to receive a single numerology in a resource unit and discard the further numerologies therein.

For example, the reception device 460 is configured to receive data where the numerology of 15 kHz SCS is used for data transmission. In the absence of parallel processing capabilities, the reception device would have to be re-configured to receive a reference signal the numerology of 30 kHz SCS is used for reference signal transmission. On the other hand, the scheduler can make sure when scheduling the data transmission for such device that no data and reference signal are intended to the same device.

The CP removal section removes in the digital reception signal the appended cyclic prefix of length corresponding to the numerology, and the FFT circuit performs fast Fourier transform operations with an accordingly adapted numbers of subcarriers to convert the digital reception signal from time to frequency domain. In other words, the sizes of the fast Fourier transforms must be chosen in correspondence with the numerology.

Then, the subcarrier de-mapping circuits de-maps the subcarriers of the corresponding numerology to modulated data and outputs same to the demodulation circuit. The de-mapping is carried out in accordance with a mapping indication received in the de-mapping circuit. In other words, the mapping indication helps the subcarrier de-mapping circuit to identify the subcarriers of the corresponding numerology and to discard the sub carriers of the other numerology/numerologies.

In the demodulation circuit, the subcarriers of the corresponding numerology are demodulated in accordance with the modulation and coding scheme to recover the data transmitted therein. The same processing flow would take place if the reception device 460 was configured to receive a reference signal. Only then, the processing would have to be adapted to the numerology of 30 kHz SCS which is used for reference signal transmission.

Again, it shall be emphasized that the above described operation of the reception device 460 is the same for the transmission of any kind of data including control data and payload. In this respect, no further distinction is made for the reception of the mapping indication-The mapping indication may be valid for a resource unit, or may be valid for a number of successive resources units, for example, if the data transmission is scheduled over a range that spans over multiple resource units. In this respect, the processing in the reception device must only be reconfigured if the mapping indication is no longer valid.

As apparent from the above, an efficient signaling for transmitting the mapping indication is necessary which can flexibly accommodate references to subcarriers of different numerologies. For this purpose, a mapping indication is devised which only comprises references to inter-numerology orthogonal subcarriers.

Inter-Numerology-Orthogonality

As explained above with respect to FIG. 2, when nested subcarriers of different numerologies are used, certain subcarriers of different numerologies are orthogonal across numerologies. Subcarriers are said to be inter-numerology-orthogonal if the following condition applies: If and only if these subcarriers are used for transmission by one numerology, the signal carried by these subcarriers can be received without interference by using another numerology.

For instance, the first numerology may have a SCS of 60 kHz, and the second numerology may have a SCS of 15 kHz. The transmitting device may then transmit an OFDM symbol for the inter-numerology-orthogonal subcarriers of the numerology having the 15 kHz subcarrier spacing, namely the #0, #4, #8, . . . subcarriers, following the subcarrier numbering of FIG. 2. At the reception device, by using 60 kHz SCS the exact transmitted data can be recovered over the subcarriers of 15 kHz SCS without having inter-numerology interference.

However, if, any one or multiple non-inter-numerology-orthogonal subcarrier(s) e.g., subcarrier #1, of the numerology having the 15 kHz SCS is transmitted, it will produce interference to all subcarriers of the 60 kHz SCS when the transmitted signal is recovered with 60 kHz SCS. In the said example, the subcarriers #0 and #1 in 60 kHz SCS which are closest to subcarrier #1 in 15 kHz will then be largely affected by inter-numerology interference generated by subcarrier #1 in 15 kHz SCS.

The present disclosure is not limited to the SCS of the first numerology being 60 kHz and the subcarrier spacing of the second numerology being 15 kHz. Other mixed numerologies may include, for example, the subcarrier spacing of the first numerology is 60 kHz, and the subcarrier spacing of the second numerology may also be 30 kHz. Further exemplary, the subcarrier spacing of the first numerology may be, larger than 60 kHz, e.g., 120 kHz. Moreover, numerologies having nested subcarrier spacings of 10 kHz, 20 kHz, 40 kHz, and 80 kHz may also be used.

Accordingly, two numerologies can be chosen in a way that the subcarriers of the first numerology are orthogonal to each other. The subcarriers of the second numerology comprise inter-numerology-orthogonal subcarriers and non-inter-numerology-orthogonal subcarriers.

As shown in FIG. 2, each subcarrier of the inter-orthogonal subcarriers of the second numerology is centrally aligned with a subcarrier of the first numerology in case the first numerology has a larger subcarrier spacing than the second numerology. In other words, inter-numerology orthogonal subcarriers of the second numerology each are co-located with a subcarrier of the first numerology.

The non-inter-orthogonal subcarriers are not centrally aligned with any subcarrier of the first numerology and located between two adjacent subcarriers of the first numerology. For instance, if the first and second numerologies are 60 kHz SCS and 30 kHz SCS, respectively, the subcarriers #0, #2, #4, . . . of the 30 kHz SCS are respectively centrally aligned with the subcarriers #0, #1, #2, . . . of the first numerology. On the other hand, subcarriers #1, #3, #5 of the second numerology are not centrally aligned with any subcarrier of the first numerology, although typically, within each numerology, the subcarriers are orthogonal to each other.

The two centrally aligned subcarriers themselves could interfere with each other if both are modulated by non-zero power. E.g., in FIG. 2, subcarrier #2 of the numerology with 30 kHz SCS will interfere with subcarrier #1 of the numerology with 60 kHz SCS if both are used for transmission. However, said subcarrier #2 of the numerology with 30 kHz SCS will not interfere with any other subcarrier of the numerology with 60 kHz SCS.

Therefore, in this disclosure the centrally aligned subcarriers from different numerologies are called "inter-numerology-orthogonal" subcarriers with the understanding that as long as only one of the collocated subcarriers are allocated non-zero power there will be no interference between any two non-collocated subcarriers regardless of the numerology that the subcarriers belong to.

Mapping Indication

As already discussed before, the mapping indication is efficiently signaled if it can flexibly accommodate references to subcarriers within a resource unit with different numerologies. The flexibly is achieved by the mapping indication referencing only inter-numerology-orthogonal subcarriers of the different numerologies in a resource unit with mixed numerologies. Thus, the mapping indication assists in receiving data and/or reference signals in a resource unit with different numerologies.

In detail, the mapping indication comprises references to subcarriers from the first numerology, or from the second numerology, or from both the first and the second numerology. Only in the rare case that the reception of different numerologies is enabled in the reception device, the mapping indication would comprise references to both the first and the second numerology. Even in this case, it is possible to configure two mapping indications, e.g., one for data referencing one numerology, another is for CSI-RS referencing another numerology. To enable one mapping indication to reference both first and second numerology, however, sometimes can save the monitoring efforts of the terminals. In the more common case, the mapping indication comprises either references to the first numerology or references to the second numerology.

In the following, it is assumed that the first numerology differs from the second numerology by a larger subcarrier spacing. As exemplified in FIGS. 7A and 7B, the first numerology may use a 30 kHz SCS for reference signal (e.g., CSI-RS) transmission (left side in FIG. 7A) and the second numerology may use a 15 kHz SCS for data (e.g., PDSCH) transmission (right side in FIG. 7A), or the first numerology may use a 4*15=60 kHz SCS (left side in FIG. 7B) and the second numerology may use a 15 kHz SCS (right side in FIG. 7B).

Under the assumption that the first numerology has a larger subcarrier spacing than the second numerology, the mapping indication is defined for the first numerology to comprise references to all subcarriers of the first numerology in the resource unit, and for the second numerology to comprise references to only inter-numerology-orthogonal subcarriers of the second numerology in the reference unit. Consistent with the above, each of the inter-numerology-orthogonal subcarriers of the second numerology are centrally aligned with a subcarrier of the first numerology.

Advantageously, the mapping indication comprises, for both, the first and the second numerology, the same number of references to subcarriers. Due to the different numerologies, centrally aligned subcarriers are, however, referenced with different subcarrier indices, as apparent from FIG. 2.

This definition of the mapping indication, however, results in situation that for the second numerology, non-inter-numerology-orthogonal subcarriers cannot be referenced. Consistent with the above, non-inter-numerology-orthogonal subcarriers are not centrally aligned with any subcarrier of the first numerology. Further, depending on the subcarrier spacing relationship between the first and second numerologies, one, three, . . . subcarrier(s) of the non-inter-numerology-orthogonal subcarriers of the second numerology is(are) located between two adjacent subcarriers of the first numerology.

The mapping indication does not reference all subcarriers in the second numerology. Moreover, the definition of the mapping indication is independent from the actual data transmission and actual reference transmission with the different numerologies. A data or a reference signal transmission using the second numerology with the smaller subcarrier spacing can be carried out on all subcarriers of the respective numerology.

With mixed numerologies, the mapping indication is still effected on an RE basis. However, the mapping indication does not necessarily reference all resource elements on which transmission can be carried out. With regard to a physical resource block (PRB), defined as comprising 12 subcarriers, it can be said that the mapping indication does not necessarily reference all (12) subcarriers forming the PRB. Independent thereof, the transmission can still be carried out on all (12) subcarriers of a PRB in the mixed numerologies.

For the example in FIG. 7A, it can be said that the mapping indication can reference all (12) subcarriers in a PRB of the first numerology (left side of FIG. 7A) and that the mapping indication can reference only 6 subcarriers in the PRB of the second numerology (right side of FIG. 7A, first PRB within one resource unit (consisting of two PRBs of second numerology)). In the example in FIG. 7B, it can be said that the mapping indication can reference all (12) subcarriers in a PRB of the first numerology (left side of FIG. 7B) and the mapping indication can only reference 3 subcarriers in one PRB of the second numerology.

In the following, two different types of transmissions are disclosed which facilitate a data transmission on subcarriers, which cannot be referenced in the mapping indication, in a resource unit with mixed numerologies.

Contiguous Type Transmissions

With mixed numerologies, "contiguous type transmissions" only apply to the transmissions, e.g., data transmissions (e.g., carried on PDSCH) or reference signal transmission (e.g., CSI-RS), on subcarriers of the numerology with the smaller subcarrier spacing (here: second numerology). Note that for the first numerology, since all the subcarriers can be referenced, then the mapping indication can easily indicate what subcarriers are used for both contiguous and non-contiguous usages. Due to the smaller subcarrier spacing, only in the second numerology there are subcarriers (i.e., non-inter-numerology-orthogonal subcarriers) which cannot be referenced. Thus, the following applies to second numerology transmissions in a mixed numerology reference units only.

In this context, a contiguous type transmission defines that a mapping indication referencing an inter-numerology orthogonal subcarrier of the second numerology is interpreted as (also) referencing the subsequent non-inter-numerology-orthogonal subcarriers. Due to this interpretation of the mapping indication, contiguous groups of one inter-numerology-orthogonal subcarrier, and one or more contiguous non-inter-numerology-orthogonal subcarriers, can be used for contiguous type transmissions (and receptions).

Again, for contiguous type transmissions the mapping indication still does only reference inter-numerology-orthogonal subcarriers of the second numerology. However, a consistent interpretation of the mapping indication in the transmission device and in the reception device allows for contiguous type transmission in the second numerology. In other words, the transmitting device and the receiving device, both understand the mapping indication as if it was referencing "only" groups of on inter-numerology-orthogonal and one or more contiguous non-inter-numerology-orthogonal subcarriers.

For example, in FIG. 8A a contiguous type data transmission (e.g., carried on PDSCH) is shown for a second numerology with 15 kHz SCS. In more detail, in this figure it is assumed that the transmitting device maps data and reference signals with mixed numerologies. The transmitting device uses mixed numerologies in spite of reference unit showing no reference signal transmissions in the first numerology (left part of FIG. 8A). In particular, the transmitting device maps the data transmission to the group of the inter-numerology-orthogonal subcarrier #0 (when assuming a numbering in line with FIG. 2, counting from top to bottom in FIG. 8A), and the non-inter-numerology-orthogonal subcarrier #1 which is contiguous to the subcarrier #0 (right part of FIG. 8A).

A similar contiguous type data transmission (e.g., carried on PDSCH) is shown in FIG. 10A for a second numerology using 15 kHz SCS in a reference unit where the first numerology uses 60 kHz SCS.

Referring to the example in FIG. 9A, again a contiguous type data transmission (e.g., carried on PDSCH) is shown for a second numerology with 15 kHz SCS. In more detail, the figure shows a resource unit where the transmission device transmits data and reference signals with mixed numerologies. The reference signal transmission (e.g., CSI-RS) is carried out by the transmission device on subcarrier #0 and subcarrier #1 of the first numerology with 30 kHz SCS (when assuming a numbering in line with FIG. 2, counting from top to bottom in FIG. 9A). At the same time, the transmission device carries out contiguous type data transmissions on subcarrier #6 to subcarrier #21 of the second numerology, namely in eight groups of one inter-numerology-orthogonal and one contiguous non-inter-numerology-orthogonal subcarrier of the second numerology.

In both of the two examples, the transmitting device and the receiving device have a common interpretation of the mapping indication, namely in that a reference to an inter-numerology-orthogonal subcarrier is interpreted as referring also to the contiguous non-inter-numerology-orthogonal subcarrier of the second numerology.

Referring again to FIG. 9A, therein the result of an advantageous mapping rule is depicted which facilitates further reducing the interfere-numerology-interference. For this purpose, the transmitting device maps data and reference signal transmissions to subcarriers of the first and second numerology, respectively, such that a "gap" occurs between the first and second numerology. In other words, the transmitting device assigns no transmit power to at least one subcarrier which is located between a subcarrier of the first numerology to which the reference signal is mapped, and another subcarrier of the second numerology to which the data is mapped.

In the example in FIG. 9A, no transmit power is assigned to the subcarrier #4 and the subcarrier #5 of the second numerology (right side of FIG. 9A), neither transmit power is assigned to the subcarrier #2 of the first numerology (left side of FIG. 9A) assuming a same numbering as in FIG. 2 and counting from top to bottom in FIG. 9A. Thereby, inter-numerology-interference between the first and the second numerology reduces. To reduce interference from a frequency wrap-around, zero transmit power is also assigned to the subcarrier #22 and subcarrier #23 of the second numerology.

The resource fragmentation can be avoided, if the "gap" occurs with respect to the larger subcarrier spacing of the first numerology. In other words the assignment of no transmit power to subcarriers located between those of the first numerology and of the second numerology is carried out such that always an inter-numerology-orthogonal subcarrier and one or more non-inter-numerology-orthogonal subcarriers (e.g., corresponding together to the subcarrier spacing of the first numerology) together are assigned with no transmit power. To further reduce the inter-numerology interference, more than one such subcarrier bundles can be assigned with zero power, with the price of less resources available for data and/or reference signal transmission.

The examples of FIG. 8A and FIG. 9A show the mixed numerologies with the scaling factor of 2, e.g., 30 kHz SCS versus 15 kHz SCS. FIG. 10A depicts another example where the scaling factor of 4 is used.

Non-Contiguous Type Transmissions

With mixed numerologies, also "non-contiguous type" transmissions only apply to the transmissions, e.g., data transmissions (e.g., carried on PDSCH) or reference signal transmissions (e.g., CSI-RS), on subcarriers of the numerology with the smaller subcarrier spacing. Due to the smaller subcarrier spacing, only in the second numerology there are subcarriers (i.e., non-inter-numerology-orthogonal subcarriers) which cannot be referenced. Thus, the following applies to second numerology transmissions in a mixed numerology reference unit only.

In this context, a non-contiguous type transmission defines that the mapping indication referencing an inter-numerology-orthogonal subcarrier of the second numerology is interpreted as (explicitly) not referencing the contiguous non-inter-numerology-orthogonal subcarrier(s), which is(are) instead assigned no transmission power. Due to this interpretation of the mapping indication, non-contiguous groups of inter-numerology-orthogonal subcarriers (i.e., excluding the non-inter-numerology-orthogonal subcarrier(s)) can only be used for non-contiguous type transmissions (and receptions).

Again, for non-contiguous type transmission the mapping indication still does only reference inter-numerology-orthogonal subcarriers of the second numerology. However, a consistent interpretation of the mapping indication in the transmission device and in the reception device allows for non-contiguous type transmissions in the second numerology. In other words, the transmitting device and the receiving device, both understand the mapping indication as if it was prescribing that the no transmit power is assigned to the non-inter-numerology-orthogonal subcarrier(s) which is(are) located contiguous to the reference inter-numerology-orthogonal subcarrier of the second numerology.

In different words, for non-contiguous type transmission, the transmit device assigns no transmit power to any non-inter-numerology-orthogonal subcarrier, which is located between two inter-numerology-orthogonal subcarriers of the second numerology.

For example, in FIG. 8B a non-contiguous type data transmission (e.g., carried on PDSCH) is shown for a second numerology with 15 kHz SCS. In more detail, in this figure it is assumed that the transmitting device maps data and reference signals with mixed numerologies. The transmitting device uses mixed numerologies in spite of the reference unit showing no reference signal transmissions in the first numerology (left part of FIG. 8B). In particular, the transmitting device maps the data transmission to all (12) inter-numerology-orthogonal subcarriers of the second numerology in the resource unit, i.e., to even numbered subcarrier #0, #2, #4 to subcarrier #22 (when assuming a numbering in line with FIG. 2, counting from top to bottom in FIG. 8B) in a non-contiguous manner, such that no transmit power is assigned to the non-inter-numerology-orthogonal subcarriers of the second numerology, i.e., odd numbered subcarrier #1, #3, #5 to subcarrier #23 (right side of FIG. 8B).

A similar non-contiguous type data transmission (e.g., carried on PDSCH) is shown in FIG. 10B for a second numerology using 15 kHz SCS in a reference unit where the first numerology uses 60 kHz SCS.

Referring to the example in FIG. 9A, again a non-contiguous type data transmission (e.g., carried on PDSCH) is shown for a second numerology with 15 kHz SCS. In more detail, the figure shows a resource unit where the transmission device transmits data and reference signals with mixed numerologies. The reference signal transmission (e.g., CSI-RS) is carried out by the transmission device on subcarrier #0 and subcarrier #1 of the first numerology with 30 kHz SCS (when assuming a numbering in line with FIG. 2, counting from top to bottom in FIG. 9A). At the same time, the transmission device carries out non-contiguous type data transmissions on the even numbered subcarrier #4, #6, #8 to subcarrier #22 of the second numerology, namely in ten non-contiguous groups of one inter-numerology-orthogonal subcarrier and one no-transmit-power-assigned non-inter-numerology-orthogonal subcarrier.

In both of the two examples, the transmitting device and the receiving device have a common interpretation of the mapping indication, namely in that a reference to the inter-numerology-orthogonal subcarrier is interpreted as prescribing the assignment of no transmit power to the contiguous non-inter-numerology-orthogonal subcarrier of the second numerology.

Advantageously, with the non-contiguous type transmissions in the second numerology, there is no inter-numerology interference since transmissions using the second numerology are restricted to inter-numerology-orthogonal subcarriers only, even though two numerologies are multiplexed within a resource unit However, comparing FIG. 9B to FIG. 9A, with the same number of REs used for CSI-RS with the first numerology, the number of REs used for data with the second numerology in non-contiguous type transmission is smaller. Therefore, there is a tradeoff between reducing inter-numerology interference and resource utilization. In certain application scenario, to have inter-numerology interference free configuration is important, then non-contiguous type transmission can be configured. In other scenarios where the inter-numerology interference have less impact, contiguous type transmission can be configured. To ensure the transmitter and receiver to have the same understanding of the transmission type, the mapping indication can indicate which type is being used by, e.g., a flag.

The examples of FIG. 8B and FIG. 9B show the mixed numerologies with the scaling factor of 2, e.g., 30 kHz SCS versus 15 kHz SCS. FIG. 10B depicts another example where the scaling factor of 4 is used.

Exemplary Implementations of the Mapping Indication

In the following, exemplary implementations of the mapping indication will be described with reference to FIGS. 8-10. All exemplary implementation consider a scenario where the reception device can only be configured to receive subcarriers of a single numerology from mixed numerology data and reference signal transmissions in a reference unit. In this respect, the mapping indication transmitted by the transmission device and received by the reception device exclusively references subcarriers of the first or the second numerology.

In an exemplary implementation, the mapping indication, which is transmitted by the transmission device and received by the reception device, comprises binary information (also referred to as bitmap) referencing each of the subcarriers of either the first or the second numerology which can be referenced in the mixed numerology reference unit (e.g., obeying the above described restrictions to the mapping indication). In other words, for the first numerology with the larger subcarrier spacing, the mapping indication comprises, in this exemplary implementation, binary information for all subcarriers in the mixed numerology resource unit. For the second numerology with the smaller subcarrier spacing, the mapping indication comprises, in this exemplary implementation, binary information for only the inter-numerology-orthogonal subcarriers which can be referenced.

This exemplary implementation is shown, for example, in FIGS. 9A and 9B where the binary information for the data transmission (e.g., carried on PDSCH) using the second numerology with the 15 kHz SCS is 0001 1111 1110 assuming a top to bottom referencing of the subcarriers in FIG. 8A, or 0011 1111 1111 assuming a top to bottom reference of the subcarriers in FIG. 8B.

As can be readily appreciated from FIGS. 8A and 8B, this exemplary implementation of the mapping indication does not change between a contiguous type transmission and a non-contiguous type transmission on subcarriers of the second numerology with the smaller subcarrier spacing. In both cases, the mapping indication comprises 12 bits each referencing a specific inter-numerology-orthogonal subcarrier of the second numerology.

In another exemplary implementation, the mapping indication, which is transmitted by the transmission device and received by the reception device, comprises a reference to a start subcarrier of either the first or the second numerology which can be referenced in the mixed numerology reference unit (e.g., obeying the above described restrictions to the mapping indication), and further comprises a number of contiguous subcarriers from the subcarriers of the same numerology which can be referenced.

For example, in this other exemplary implementation, the mapping indication may comprise for referencing a data transmission (e.g., carried on PDSCH) using the second numerology with the 15 kHz SCS as shown in FIG. 9A, a reference to the start subcarrier being the fourth inter-numerology-orthogonal carrier would correspond to decimal 3=binary 0011 and the number of contiguous inter-numerology-orthogonal carriers would correspond to decimal 7=binary 0111 thereby resulting in a mapping indication of 0011 0111.

For referencing a data transmission (e.g., carried on PDSCH) using the second numerology (also) with 15 kHz SCS as shown in FIG. 9B, a reference to the start subcarrier being the third inter-numerology-orthogonal carrier would correspond to decimal 2=binary 0010 and the number of contiguous inter-numerology orthogonal would correspond to decimal 9=binary 1001 thereby resulting in a mapping indication of 0010 1001.

Also here it can be advantageously appreciated that the mapping indication does not change between a contiguous type transmission and a non-contiguous type transmission on subcarriers on the second numerology with the smaller subcarrier spacing. In both cases, the mapping indicator comprises 8 bits (4 bits for the starting position and 4 bits for the length) The bit length can be further reduced by a smarter encoding method. Consider the example shown in FIG. 9A and FIG. 9B where one resource unit has 12 inter-numerology orthogonal subcarriers. The total number of combinations for the staring position and the length is 12+11+ . . . +1=78. Therefore, only log 2(78)=7 bits are needed.

A further exemplary implementation, only applies to mapping indication for non-contiguous type transmissions exclusively referencing subcarriers of a second numerology in a mixed numerology reference unit. There, the mapping indication comprises one binary information for each of the inter-numerology-orthogonal subcarriers of the second numerology. This binary information corresponds to what is described before. Additionally, the mapping indication comprises one binary information for each group of non-inter-numerology-orthogonal subcarriers of the second numerology. One such example is given in FIG. 10C. This implementation is particularly advantageous as in case of large difference in subcarrier spacing between first and second numerology, while at the same time maintaining the flexibility of referencing contiguous subcarriers in the reference unit.

In an even further exemplary implementation, the mapping indication, which is transmitted by the transmission device and received by the reception device, additionally comprises an indication of the number of symbols comprised in the time domain in the respective subcarrier of either the first or the second numerology. This implementation is applicable to either one of the above described exemplary implementation, and expands the understanding that the resource unit has a time duration comprising at least one symbol in time domain. When the transmission device maps a data and/or reference signal onto the at least one symbol, then the mapping indication, in this exemplary indication, comprises a reference for each of the symbols to the corresponding subcarrier comprised in the resource unit.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

According to a first aspect, a transmission device is suggested, which comprises a circuitry which, in operation, maps data and/or a reference signal onto a resource unit of a communication system. The resource unit includes subcarriers of a first numerology and subcarriers of a second numerology, each of the subcarriers being orthogonal to the other subcarriers of the same numerology, wherein the first numerology differs from the second numerology at least by a larger subcarrier spacing, and the subcarriers of the first and the second numerologies are frequency-multiplexed on a subcarrier basis. The transmission device further comprises a transmitter which, in operation, transmits the mapped data and/or reference signal in the resource unit, including subcarriers of the first and/or of the second numerology. Also, the transmitter, in operation, transmits an indication of the mapping for the resource unit, which comprises references to subcarriers from the subcarriers of the first and/or the second numerology, where: for the first numerology, all subcarriers of the resource unit can be referenced, and for the second numerology, only inter-numerology-orthogonal subcarriers thereof can be referenced, each of the inter-numerology-orthogonal subcarriers being centrally aligned with a subcarrier of the first numerology.

According to a second aspect, which can be combined with the first aspect, the circuitry of the transmission device, in operation, maps the data to the subcarriers of one of the first and second numerologies, and maps the reference signal to subcarriers of the respective other numerology of the first and second numerologies.

According to a third aspect, which can be combined with the first or second aspect, the subcarriers of the second numerology comprise, further to the inter-numerology-orthogonal subcarriers, non-inter-numerology-orthogonal subcarriers not centrally aligned with any subcarrier of the first numerology and located between two adjacent subcarriers of the first numerology.

According to a fourth aspect, which can be combined with the third aspect, the transmitter of the transmission device, in operation, transmits the data and/or reference signal on inter-numerology-orthogonal, and non-inter-numerology-orthogonal subcarriers of the second numerology.

According to a fifth aspect, which can be combined with the third or fourth aspect, the circuitry of the transmission device, in operation, maps the data and/or reference signal to a inter-numerology-orthogonal subcarrier of the second numerology, and to at least one non-inter-numerology-orthogonal subcarrier of the second numerology, which is contiguous to the inter-numerology-orthogonal subcarrier.

According to a sixth aspect, which can be combined with the fifth aspect, the circuitry of the transmission device, in operation, assigns no transmit power to at least one subcarrier of the resource unit located between a subcarrier of the first numerology and a subcarrier of the second numerology to both of which the data and/or reference signal are mapped.

According to a seventh aspect, which can be combined with the sixth aspect, the at least one subcarrier of the resource unit, to which no transmit power is assigned, comprises an inter-numerology-orthogonal subcarrier and at least one non-inter-numerology-orthogonal subcarriers of the second numerology.

According to a eighth aspect, which can be combined with the third aspect, the transmitter of the transmission device, in operation, transmits the data and/or reference signals on inter-numerology-orthogonal subcarriers of the second numerology, and the circuitry of the transmission device, in operation, assigns no transmit power to any non-inter-numerology-orthogonal subcarrier located between two inter-numerology-orthogonal subcarriers of the second numerology.

According to a ninth aspect, which can be combined with the first to eighth aspect, the transmitter of the transmission device, in operation, transmits the indication of the mapping for the resource unit which comprises binary information referencing each of subcarriers of the first or second numerology which can be referenced.

According to a tenth aspect, which can be combined with the first to eighth aspect, the transmitter of the transmission device, in operation, transmits the indication of the mapping for the resource unit which comprises a reference to a start subcarrier of the first or the second numerology, and a number referencing successive subcarriers from the subcarriers of the same numerology which can be referenced.

According to a eleventh aspect, which can be combined with the third to eighth aspect, in case the transmitter of the transmission device, in operation, transmits the indication of the mapping for the resource unit which is exclusively referencing the subcarriers of the second numerology, then the indication of the mapping for the resource unit comprises binary information referencing each of the inter-numerology-orthogonal subcarriers of the second numerology, and optionally further comprises supplemental information indicating if or if not the circuitry has also mapped the data and/or reference signal to at least one contiguous non-inter-numerology-orthogonal subcarrier of the second numerology.

According to a twelfth aspect, which can be combined with the first to eleventh aspect, the transmitter of the transmission device, in operation, transmits the indication of the mapping for the resource unit which is exclusively referencing the subcarriers of the first or the second numerology.

According to a thirteenth aspect, which can be combined with the first to twelfth aspect, the resource unit has a time-duration comprising at least one symbol in a time domain, and the circuitry of the transmission device, in operation, maps the data and/or reference signal onto the at least one symbol comprised in the resource unit, and the transmitter of the transmission device, in operation, transmits an indication of the mapping for each of the symbols comprised in the resource unit.

According to a fourteenth aspect, which can be combined with the first to thirteenth aspect, the reference signal is one of a non-zero-power reference signal or a zero-power reference signal.

According to a fifteenth aspect, which can be combined with the first to fourteenth aspect, in the resource unit, the subcarriers of the first numerology correspond to a physical resource block.

According to sixteenth aspect, a reception device is proposed. The reception device comprises a receiver, which, in operation, receives data and/or a reference signal in a resource unit of a communication system. The resource unit includes subcarriers of a first numerology and subcarriers of a second numerology, each of the subcarriers being orthogonal to the other subcarriers of the same numerology, wherein the first numerology differs from the second numerology at least by a larger subcarrier spacing, and the subcarriers of the first and the second numerologies are frequency-multiplexed on a subcarrier basis. The reception device further comprises a circuitry, which, in operation, de-maps the data and/or the reference signal from the resource unit, including subcarriers of the first and/or of the second numerology. The receiver, in operation, also receives an indication of the mapping for the resource unit, which comprises references to subcarriers from the subcarriers of the first and/or the second numerology, where: for the first numerology, all subcarriers of the resource unit can be referenced, and for the second numerology, only inter-numerology-orthogonal subcarriers thereof can be referenced, each of the inter-numerology-orthogonal subcarriers being centrally aligned with a subcarrier of the first numerology.

According to a seventeenth aspect, which can be combined with the sixteenth aspect, the circuitry of the reception device, in operation, de-maps the data from the subcarriers of one of the first and second numerologies, and de-maps the reference signal from subcarriers of the respective other numerology of the first and second numerologies.

According to an eighteenth aspect, which can be combined with the sixteenth or seventeenth aspect, the subcarriers of the second numerology comprise, further to the inter-numerology-orthogonal subcarriers, non-inter-numerology-orthogonal subcarriers not centrally aligned with any subcarrier of the first numerology and located between two adjacent subcarriers of the first numerology.

According to a nineteenth aspect, which can be combined with the eighteenth aspect, the receiver of the reception device, in operation, receives the data and/or reference signal on inter-numerology-orthogonal, and non-inter-numerology-orthogonal subcarriers of the second numerology.

According to a twentieth aspect, which can be combined with the eighteenth aspect, the circuitry of the reception device, in operation, de-maps the data and/or reference signal from an inter-numerology-orthogonal subcarrier of the second numerology, and from at least one non-inter-numerology-orthogonal subcarrier of the second numerology, which is contiguous to the inter-numerology-orthogonal subcarrier.

According to a twenty-first aspect, which can be combined with the eighteenth to twentieth aspect, at least one subcarrier is assigned no transmit power to of the resource unit located between a subcarrier of the first numerology and a subcarrier of the second numerology to both of which the data and/or reference signal are mapped.

According to a twenty-second aspect, which can be combined with the twenty-first aspect, the at least one subcarrier of the resource unit, to which no transmit power is assigned, comprises an inter-numerology-orthogonal subcarrier and at least one non-inter-numerology-orthogonal subcarriers of the second numerology.

According to a twenty-third aspect, which can be combined with the eighteenth aspect, the receiver of the reception device, in operation, receives the data and/or reference signals on inter-numerology-orthogonal subcarriers of the second numerology, and no transmit power is assigned to any non-inter-numerology-orthogonal subcarrier located between two inter-numerology-orthogonal subcarriers of the second numerology.

According to a twenty-fourth aspect, which can be combined with the sixteenth to twenty-third aspect of the reception device, the receiver, in operation, receives the indication of the mapping for the resource unit which comprises binary information referencing each of subcarriers of the first or second numerology which can be referenced, According to a twenty-fifth aspect, which can be combined with the sixteenth to twenty-third aspect, the receiver of the reception device, in operation, receives the indication of the mapping for the resource unit which comprises a reference to a start subcarrier of the first or the second numerology, and a number referencing successive subcarriers from the subcarriers of the same numerology which can be referenced.

According to a twenty-sixth aspect, which can be combined with the eighteenth to twenty-third aspect, in case the receiver of the reception device, in operation, receives the indication of the mapping for the resource unit which is exclusively referencing the subcarriers of the second numerology, then the indication of the mapping for the resource unit comprises binary information referencing each of the inter-numerology-orthogonal subcarriers of the second numerology, and optionally further comprises supplemental information indicating if or if not the circuitry has also mapped the data and/or reference signal to at least one contiguous non-inter-numerology-orthogonal subcarrier of the second numerology.

According to a twenty-seventh aspect, which can be combined with the sixteenth to twenty-sixth aspect of the reception device, wherein: the receiver, in operation, receives the indication of the mapping for the resource unit which is exclusively referencing the subcarriers of the first or the second numerology.

According to a twenty-eighth aspect, which can be combined with the sixteenth to twenty-seventh aspect of the reception device, the resource unit has a time-duration comprising at least one symbol in a time domain, and the circuitry, in operation, de-maps the data and/or reference signal from the at least one symbol comprised in the resource unit, and the receiver, in operation, receives an indication of the mapping for each of the symbols comprised in the resource unit.

According to a twenty-ninth aspect, which can be combined with the sixteenth to twenty-eighth aspect, the reference signal is one of a non-zero-power reference signal or a zero-power reference signal.

According to a thirtieth aspect, which can be combined with the sixteenth to twenty-ninth aspect, in the resource unit, the subcarriers of the first numerology correspond to a physical resource block.

According to a thirty-first aspect, a transmission method is suggested to be performed by a transmission device, comprising the steps of: mapping data and/or a reference signal onto a resource unit of a communication system, the resource unit including subcarriers of a first numerology and subcarriers of a second numerology, each of the subcarriers being orthogonal to the other subcarriers of the same numerology, wherein the first numerology differs from the second numerology at least by a larger subcarrier spacing, and the subcarriers of the first and the second numerologies are frequency-multiplexed on a subcarrier basis, and transmitting the mapped data and/or reference signal in the resource unit, including subcarriers of the first and/or of the second numerology, and transmitting an indication of the mapping for the resource unit, which comprises references to subcarriers from the subcarriers of the first and/or the second numerology, where: for the first numerology, all subcarriers of the resource unit can be referenced, and for the second numerology, only inter-numerology-orthogonal subcarriers thereof can be referenced, each of the inter-numerology-orthogonal subcarriers being centrally aligned with a subcarrier of the first numerology.

According to a thirty-sixth aspect, a reception method is proposed to be performed in a reception device, comprising the steps of: receiving data and/or a reference signal in a resource unit of a communication system, the resource unit including subcarriers of a first numerology and subcarriers of a second numerology, each of the subcarriers being orthogonal to the other subcarriers of the same numerology, wherein the first numerology differs from the second numerology at least by a larger subcarrier spacing, and the subcarriers of the first and the second numerologies are frequency-multiplexed on a subcarrier basis, receiving an indication of the mapping for the resource unit, which comprises references to subcarriers from the subcarriers of the first and/or the second numerology, where: for the first numerology, all subcarriers of the resource unit can be referenced, and for the second numerology, only inter-numerology-orthogonal subcarriers thereof can be referenced, each of the inter-numerology-orthogonal subcarriers being centrally aligned with a subcarrier of the first numerology, and de-mapping the data and/or the reference signal from the resource unit, including subcarriers of the first and/or of the second numerology.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit for a transmission device, the integrated circuit comprising:
   mapping circuitry which, in operation, maps one or both of data and a reference signal onto a resource unit of a communication system,
   the resource unit including subcarriers of a first numerology and subcarriers of a second numerology,
   the subcarriers of the first numerology being orthogonal to each other, and
   the subcarriers of the second numerology being orthogonal to each other,
   the first numerology having a larger subcarrier spacing than the second numerology,
   subcarriers of the first and the second numerologies are frequency-multiplexed on a subcarrier basis,
   the subcarriers of the second numerology including inter-numerology-orthogonal subcarriers and non-inter-numerology-orthogonal subcarriers, each of the inter-numerology-orthogonal subcarriers being aligned with a respective subcarrier of the subcarriers of the first numerology, and each of the non-inter-numerology-orthogonal subcarriers being unaligned with the subcarriers of the first numerology and between two adjacent subcarriers of the first numerology, the mapped one or both of the data and the reference signal being mapped to a subcarrier that is among the subcarriers of the first numerology and among the inter-numerology-orthogonal subcarriers; and transmitting circuitry which, in operation, transmits the mapped one or both of the data and the reference signal on the resource unit, and transmits an indication of a mapping of the mapped one or both of the data and the reference signal on the resource unit, wherein the indication is configured to reference subcarriers among a group of subcarriers that includes the subcarriers of the first numerology and the inter-numerology-orthogonal subcarriers, and excludes the non-inter-numerology-orthogonal subcarriers.

2. The integrated circuit according to claim 1, wherein:

the mapping circuitry, in operation, maps the data to one of the subcarriers of the first numerology or the subcarriers of the second numerology, and maps the reference signal to the other of the subcarriers of the first numerology or the subcarriers of the second numerology.

3. The integrated circuit according to claim 1, wherein:

the mapping circuitry, in operation, maps the one or both of the data and the reference signal to a subcarrier of the inter-numerology-orthogonal subcarriers, and to at least one subcarrier of the non-inter-numerology-orthogonal subcarriers that is contiguous to the subcarrier of the inter-numerology-orthogonal subcarriers.

4. The integrated circuit according to claim 1, wherein:

the mapping circuitry, in operation, maps the one or both of the data and the reference signal to first and second subcarriers of the inter-numerology-orthogonal subcarriers, and assigns no transmit power to a subcarrier of the non-inter-numerology-orthogonal subcarriers that is located between the first and second subcarriers.

5. The integrated circuit according to claim 1, wherein:

the indication includes binary information referencing each subcarrier of the subcarriers of the first numerology or each subcarrier of the inter-numerology-orthogonal subcarriers.

6. The integrated circuit according to claim 1, wherein:

the indication exclusively references the subcarriers of the first numerology or the subcarriers of the second numerology.

* * * * *